Oct. 9, 1945. J. A. FORBES 2,386,453
BRAKE
Filed Dec. 7, 1942 2 Sheets-Sheet 2
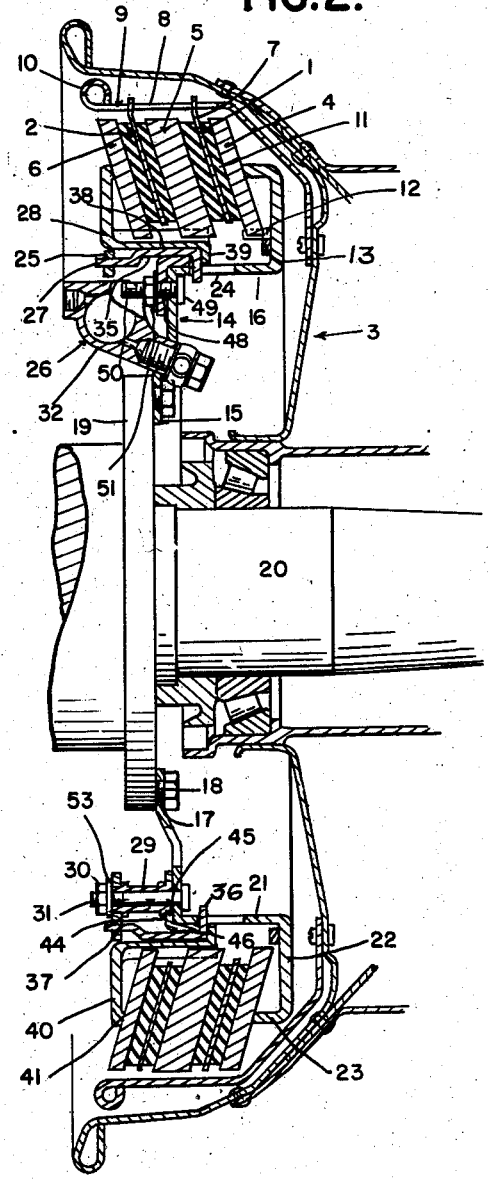
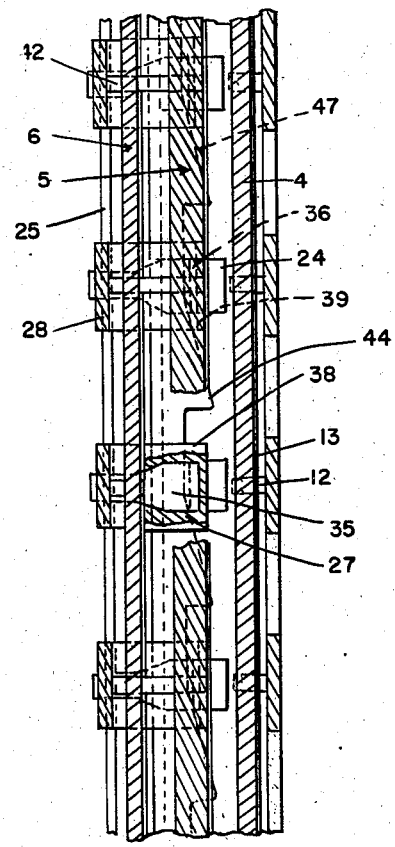
INVENTOR.
JOSEPH A. FORBES
BY
ATTORNEYS Patented Oct. 9, 1945

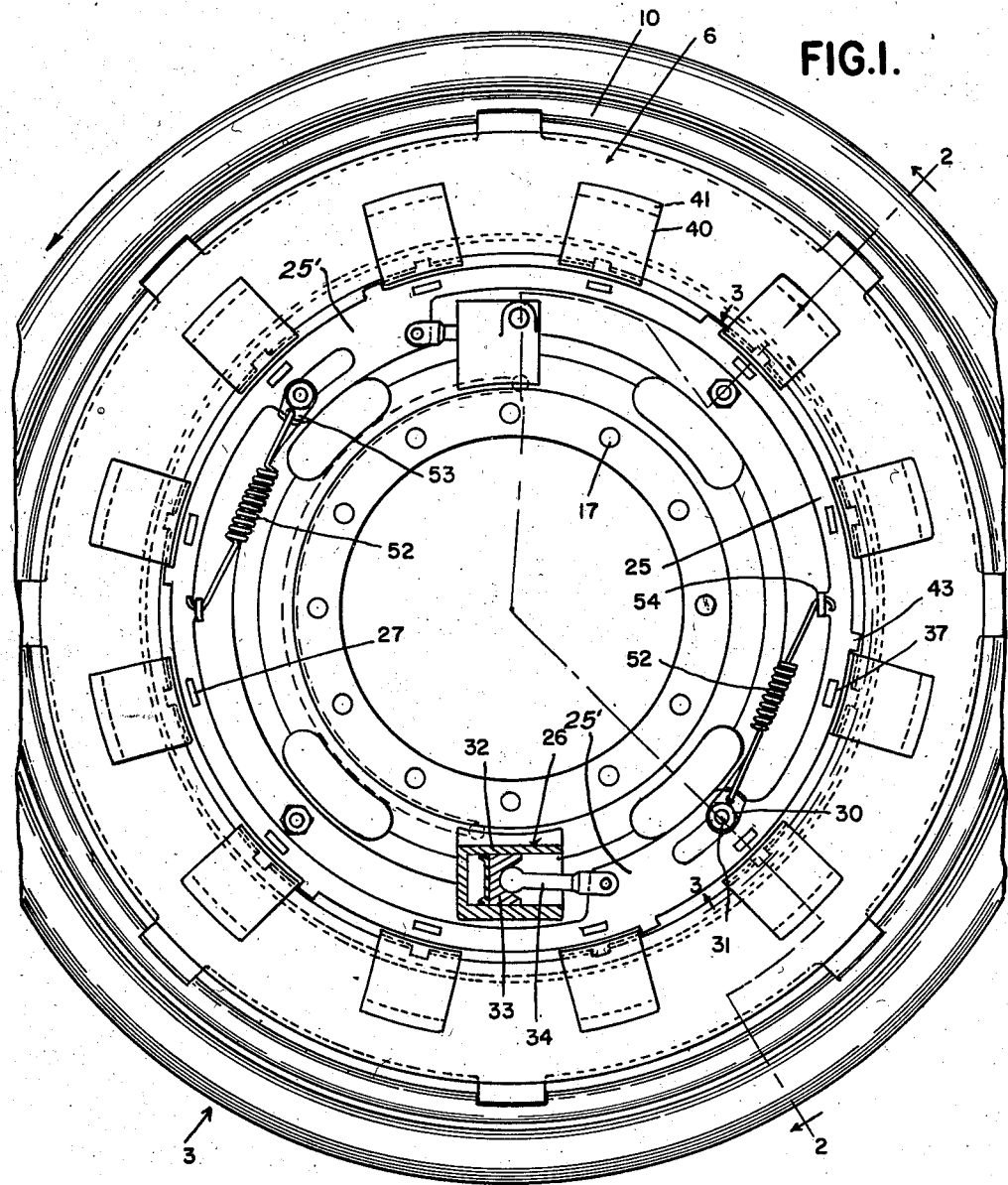

2,386,453

UNITED STATES PATENT OFFICE 2,386,453

BRAKE

Joseph A. Forbes, Detroit, Mich., assignor to Kelsey-Hayes Wheel Company, Detroit, Mich., a corporation of Delaware Application December 7, 1942, Serial No. 468,132

7 Claims. (Cl. 188—72)

The invention relates to brakes and refers more particularly to disc brakes for use in airplanes, motor vehicles and the like.

The invention has for an object to provide a powerful, compact brake.

The invention has for another object to so construct the brake that its torque reacts on the actuating mechanism to increase the pressure exerted by the actuating mechanism.

The invention has for further objects to provide a simple actuating mechanism and to provide an improved adjustment for compensating for brake lining wear.

With these as well as other objects in view, the invention resides in the novel features of construction and combinations and arrangements of parts as more fully hereinafter set forth.

In the drawings:

Figure 1 is an inboard elevation, partly broken away, illustrating a brake embodying the invention;

Figures 2 and 3 are cross sections on the lines 2—2 and 3—3, respectively, of Figure 1.

As illustrated in the present instance, the brake is for use with an airplane landing wheel and comprises relatively rotatable friction members and actuating mechanism for relatively moving the friction members into engagement to apply the brake. The relatively rotatable friction members of the brake comprise the frusto-conical outboard and inboard friction discs 1 and 2, respectively, which are rotatable with the wheel 3 and the frusto-conical outboard, intermediate and inboard friction discs 4, 5 and 6, respectively which are held from rotation and may, therefore, be called non-rotatable. The rotatable friction discs 1 and 2 are provided with the angularly spaced radial projections 7 at their radially outer edges for engaging axial slots 8 in the drum 9 which is secured to and rotates with the wheel 3. The drum is formed with the endless curled reinforcing bead 10 at its inboard edge. The rotatable friction discs are preferably provided with the friction or brake linings 11 at their opposite sides for engagement with the adjacent non-rotatable friction discs. The non-rotatable friction disc 4 is located at the outboard side of the rotatable friction disc 1 and is held from rotation by the axial projection 12 on the ring 13 extending into axial grooves formed in the radially inner edges of the friction disc. The friction discs 5 and 6 are angularly movable with the friction discs 1 and 2 to a limited extent only and this limited angular movement serves to increase the applying pressure.

14 is the carrier plate of the brake having the central mounting portion 15 and the outer rim portion 16. The mounting portion extends radially and is formed with the series of angularly spaced openings 17 for slidably receiving the cap bolts 18 which extend axially in an outboard direction from the radial flange 19 of the support having the shaft 20 on which the wheel 3 is journaled. The rim portion 16 has the annular part 21 which extends axially in an outboard direction from the mounting portion and the radially outwardly extending part 22 which extends from the outboard end of the annular part 21. The part 22 has fixedly secured to its inboard side as by welding the ring 13 and also preferably has at its radially outer edge the annular flange 23 forming an abutment for the friction disc 4. The annular part 21 of the rim portion has the annular series of openings 24 therethrough.

The actuating mechanism for moving the relatively rotatable friction discs into engagement and applying the brake comprises the actuating ring 25, the wheel cylinders 26 for actuating the ring, the set of inner levers 27 directly actuated by the ring, and the set of outer links 28 directly actuated by the inner levers and directly acting on the inboard friction disc 6. The actuating ring 25 is located at the inboard side of the carrier plate 14 and is held parallel thereto by the diametrically opposite shouldered spacers 29 and the nuts 30 threaded on the inboard ends of the bolts 31 which extend through the spacers and the carrier plate. The wheel cylinders 26 are diametrically opposite each other and arranged symmetrically. Each wheel cylinder comprises the housing 32 secured to and mounted on the mounting portion of the carrier plate, the piston 33 slidable within the housing, and the piston rod 34. Each piston rod, as shown, has one end ball-shaped to engage the piston and the other end bifurcated to be pivotally connected to the actuating ring 25. The wheel cylinders are suitably connected by a tubing which is located on the outboard side of the carrier plate 14. The tubing is arcuate or semi-circular along its length and is secured at its ends to fittings threaded into the housings of the wheel cylinders. The actuating ring is formed to clear the wheel cylinders and is preferably of greater width in the zones 25' of its pivotal connection with the piston rods and sliding connection with the shouldered spacers. The inner levers 27 have the bodies 35 the median planes of which extend axially in the off positions of the inner levers. These levers also have the transverse parts 36 at the outboard ends of the bodies and extending radially inwardly through the openings 24. The inboard ends of the bodies extend through the openings 37 in the actuating ring. The outer links 28 correspond in number to the inner levers 27 and an outer link is located radially outwardly of an inner lever. The outer links have the bodies 38 the median planes of which extend axially in the off positions of the outer links. These links also have the transverse parts 39 at the outboard ends of the bodies and extending radially inwardly and overlying the transverse parts 36. The outer links have at the inboard ends of their bodies the radially outwardly extending parts 40 each of which has the axial flange 41 at its radially outer edge forming an abutment for the inboard friction disc 6. The bodies 38 of the outer links are each provided with an axially extending radially outwardly facing projection or key 42 for engaging corresponding grooves formed in the radially inner edges of the friction discs 5 and 6 so that angular movement of these friction discs compels corresponding bodily angular movement of the outer links. The angular movement of the outer links is limited by providing the radially outwardly extending projections 43 on the actuating ring 25 engageable with certain of the outer links when they are angularly moved by the friction discs 5 and 6 when the latter are forced into engagement with the friction discs 1 and 2 which are rotating in the direction of the arrow, as shown in Figure 1. It is apparent that if desired the actuating ring may be provided with a radially outwardly extending projection for each outer link.

To adjust the friction discs to compensate for friction or brake lining wear, I have provided the cam ring 44 of angular cross section. The ring has the radial part 45 located at the inboard side of the carrier plate 14 and the annular axial part 46 encircling the annular part 21 of the rim portion of the carrier plate. The annular axial part has at its inboard edge the angularly spaced cams 47 which are engageable with the inboard sides of the transverse parts 36 of the inner levers. The cams are inclined with respect to a plane at right angles to the axis of the brake.

To facilitate the adjustment, I have provided the diametrically opposite members 48 threadedly engaging the carrier plate 14 with each having the head 49 engageable with the inboard side of the transverse part 36 of an inner lever. Each member 48 also preferably has its inboard end slotted at 50 for receiving a suitable tool, such as a screw driver. 51 is a nut threaded on each member 48 and adapted to clamp the cam ring in adjusted position. It will be noted that the friction discs 1, 2, 4, 5 and 6 may be relatively adjusted by loosening the nuts 51 and then turning the members 48 in to move the friction discs tightly into engagement through the heads 49. Then the members 48 may be unscrewed a predetermined fraction of a turn to secure a predetermined clearance between the brake linings and their associated friction discs. The cam ring then may be peripherally adjusted to bring its cams 47 against the transverse parts 36 of the inner levers, after which the members 48 may be backed off and the nuts 51 may be turned down to clamp the cam ring in place.

For normally holding the parts in their off positions, there are the diametrically opposite coil springs 52 having one end connected to the plate 53 upon the associated bolt 31 and the other end connected to the ear 54 upon the actuating ring 25. It will be seen that these coil springs serve to hold the actuating ring in its off position, as determined by the spacers 29 engaging the ends of the concentric slots in the actuating ring through which these spacers pass. It will also be seen that the radially outwardly extending projections on the actuating ring serve to return the outer links to their off positions, thereby permitting the relatively rotatable friction discs to separate to their off positions.

With the parts in the positions indicated in the drawings and with the wheel 3 and the rotatable friction discs 1 and 2 rotating in the direction of the arrow in Figure 1, it will be seen that when braking fluid is forced under pressure into the wheel cylinders 26 the actuating ring 25 will be moved circumferentially in a counterclockwise direction, as viewed in Figure 1, this being the same as indicated by the arrow. The circumferential movement of the actuating ring compels the inner levers 27 to swing with their transverse parts 36 fulcruming on the cams 47 of the cam ring 44. The transverse parts 36 engage the transverse parts 39 of the outer links 28 to compel the latter to move axially in an outboard direction which through the axial flanges 41 causes the friction discs to move into engagement with each other. The frictional engagement of the discs causes the discs 5 and 6 to move angularly and these discs compel the outer links 28 to move angularly to a limited extent bringing their inboard ends into engagement with the radially outwardly extending projections 43 upon the actuating ring. The force exerted by the outer levers upon the actuating ring is transmitted through the actuating ring to the inner levers, thereby increasing the applying pressure. It will thus be seen that a very powerful brake is secured without the necessity of making the wheel cylinders very powerful. It will also be seen that the construction is such that the brake is compact.

What I claim as my invention is:

1. A brake comprising relatively rotatable friction discs, an actuating ring, a set of angularly movable levers operatively connected to said ring, a set of links actuable by said angularly movable levers, said links being operatively connected to and movable circumferentially with certain of said friction members and being operatively connected to said ring.

2. A brake comprising a carrier plate, relatively rotatable friction members, angularly movable levers on said carrier plate, links actuable by said angularly movable levers and operatively connected to said friction members to move the same into engagement, and a cam ring on said carrier plate engageable with said levers for positioning the same.

3. A brake comprising a carrier plate, relatively rotatable friction members, angularly movable levers on said carrier plate, links actuable by said angularly movable levers and operatively connected to said friction members to move the same into engagement, a cam ring on said carrier plate engageable with said levers for positioning the same, and angularly spaced means on said plate engageable with said levers for predeterminedly positioning the same.

4. A brake comprising relatively rotatable friction members and means for relatively moving said friction members into engagement comprising an angularly movable lever having a body and a part transverse to said body, a link having a body and a part transverse to said last mentioned body and engageable with said first mentioned transverse part, said link also having a part engageable with one of said friction members, said link having a portion movable circumferentially with one of said friction members and said link being operatively connected to said lever to exert a force thereon tending to angularly move the same, and an abutment engageable with said first mentioned transverse part.

5. A brake comprising relatively rotatable friction members and means for relatively moving said friction members axially into engagement comprising an actuating member, a lever extending generally axially of said friction members and being movable angularly by said actuating member and a link for exerting pressure on said friction members, said link extending generally axially of said friction members and being actuable by said angularly movable lever, said link having a portion movable circumferentially with one of said friction members and operable to exert a force on said actuating member to increase its pressure upon said lever.

6. A brake comprising relatively rotatable friction members and means for relatively moving said friction members axially into engagement comprising an actuating member, cooperating members extending generally axially of said friction members with one of said members movable by said actuating member in a direction to actuate the other of said members to exert axial pressure on said friction members and with the other of said members movable by one of said friction members to exert a force on said actuating member to increase its pressure upon said one of said members in said first mentioned direction.

7. A brake comprising relatively rotatable annular friction members and means for relatively moving said friction members into engagement comprising links extending generally axially within said friction members, each link having a body, a portion transverse to said body and engageable with one of said friction members and a second portion transverse to said body, angularly movable levers normally extending generally axially within said friction members and engageable with said last mentioned transverse portions, and an annular actuating member for said levers located adjacent said first mentioned transverse portions.

JOSEPH A. FORBES.